United States Patent [19]

Brinkeborn et al.

[11] 4,140,448
[45] Feb. 20, 1979

[54] HIGH PRESSURE APPARATUS

[75] Inventors: Bertram Brinkeborn; Henry Halldin, both of Västeras; Håkan Lindqvist, Robertsfors; Erik Lundblad, Robertsfors; Kjell Nilsson, Robertsfors; Pertti Syväkari, Helsingborg, all of Sweden

[73] Assignee: Scandiamant Aktiebolag, Robertsfors, Sweden

[21] Appl. No.: 890,484

[22] Filed: Mar. 27, 1978

Related U.S. Application Data

[63] Continuation of Ser. No. 786,866, Apr. 12, 1977, which is a continuation of Ser. No. 580,465, May 22, 1975, abandoned.

[30] Foreign Application Priority Data

Jun. 6, 1974 [SE] Sweden .................................. 7407437

[51] Int. Cl.² ............................................. B30B 11/32
[52] U.S. Cl. .................................................... 425/77
[58] Field of Search ........................................... 425/77

[56] References Cited

U.S. PATENT DOCUMENTS

| 2,941,246 | 6/1960 | Bundy | 425/77 |
| 2,941,248 | 6/1960 | Hall | 425/77 |
| 2,944,289 | 7/1960 | Hall | 425/77 X |
| 3,088,170 | 5/1963 | Strong | 425/77 |
| 3,895,894 | 7/1975 | Biermann et al. | 425/77 |

Primary Examiner—J. Howard Flint, Jr.
Attorney, Agent, or Firm—Young & Thompson

[57] ABSTRACT

A high pressure apparatus for the manufacture of diamonds includes a pressure chamber formed of holes in annular, disc-like members arranged one after the other and a pair of opposed pressure-exerting members movable into the chamber formed by the holes with compressible gaskets arranged between adjacent disc-like members. The pressure exerting members are frusto-conical and the ends of the holes adjacent these members are similarly shaped.

3 Claims, 2 Drawing Figures

HIGH PRESSURE APPARATUS

RELATED INVENTIONS

This application is a continuation of application Ser. No. 786,866, filed Apr. 12, 1977, which in turn was a continuation of application Ser. No. 580,465, filed May 22, 1975 now abandoned.

BACKGROUND OF THE INVENTION

1. Field of the Invention

The invention relates to an apparatus for generating very high pressures, for example the conversion of graphite to diamonds.

2. The Prior Art

Known apparatus for the generating very high pressures, e.g. known apparatus for conversion of graphite to diamond, have pressure chambers with relatively small volumes. It has long been desirable to achieve high pressure apparatus with a greater volume of the pressure chamber since such apparatus would result in increased capacity. One reason why it has been impossible to realize this desire are the frictional forces generated between the material enclosed in the pressure chamber and the walls of the pressure chamber, as well as in the material itself, when the material is subjected to compression. The frictional forces cause the pressure to decrease successively in a direction towards the interior of the volume of the material and therefore limit the thickness in the direction of compression of the volume material within which it is possible everywhere to attain a certain desirable minimum pressure, that is, they limit the height of the pressure chamber if the compression is assumed to take place in a vertical direction. If a considerably larger volume of the pressure chamber is sought by increasing its area perpendicular to the direction of compression, other problems are encountered. One problem is that the forces which would then be required to generate the pressure are so great that they cannot be overcome under practical conditions. Another problem is that there are no possibilities of manufacturing components for the parts of the high pressure apparatus located nearest the pressure chamber. These components, for example parts of cemented carbide, would be too large to be manufactured with sufficient strength. Regardless of how the pressure is generated, the necessary gaskets must be dimensioned so as to prevent the material from flowing out of the pressure chamber. This requirement limits the thickness of the gaskets.

A high pressure apparatus which is well-known among experts and which has been used when manufacturing diamonds on a commercial scale is described in the U.S. Pat. No. 2,941,248. The apparatus comprises a pair of opposed punches and a die arranged between them with a central throughgoing hole. The two openings of the hole are formed with outwardly increasing cross-sections and each punch with an inwardly decreasing cross-section in a corresponding manner, so that the punches may be inserted into the hole to a certain depth. Between each opening of the hole of the die and each punch there is arranged a gasket which seals the pressure chamber formed of the punches and the hole of the die. This high pressure apparatus, which must be dimensioned for each specific application, has a pressure chamber with a relatively small volume. A modification of the apparatus to increase the volume of the pressure chamber would cause the problems described above.

SUMMARY OF THE INVENTION

The present invention makes it possible to construct high pressure apparatus having pressure chambers with considerably larger volumes than in previously known high pressure apparatus. The new high pressure apparatus is of the type having a pair of opposed punches or similar opposed members, at least one of them being movable to achieve a compression in its direction of movement of the material enclosed in the pressure chamber. Not least because of their simplicity, high pressure apparatus of this type have proved to possess considerable advantages under conditions in practice. The larger volume of the pressure chamber is achieved according to the invention by constructing the walls of the pressure chamber between the opposed members of several pressure-resisting elements arranged one after the other in the direction of compression, at least one compressible gasket being arranged between said elements. By this arrangement pressure is conveyed to the enclosed material at various levels in the pressure chamber when the movable member or members move, thus largely eliminating the limitation imposed by the frictional forces on the compression of the volume of the material in the direction of compression, as mentioned in the introductory part of this application. The possibility of increasing the extension of the pressure chamber in the direction of compression, according to the invention, makes it possible to increase the volume of the pressure chamber without having to make the parts of cemented carbide or other components nearest the pressure chamber so large that they cannot be made with sufficient strength.

More particularly, the present invention relates to a high pressure apparatus comprising a pressure chamber formed of a pair of opposed pressure-resisting members, at least one of them being movable in a direction towards the interior of the pressure chamber, and of limiting walls located between these members, characterised in that the limiting walls comprise walls in holes of pressure-resisting disc-like members arranged one after the other in the direction of movement of the movable member and a compressible gasket arranged between two adjacent disc-like members. When the invention is utilized to its optimum a compressible gasket is arranged between each disc-like member and each disc-like member adjacent to said first member. Preferably, a gasket is also arranged between each opposed member and the nearest disc-like member. These gaskets are preferably also compressible.

According to a preferred embodiment of the invention, in at least one of the disc-like members which are located nearest to the opposed members, at least the part of the hole located nearest the adjacent opposed member is formed with an outwardly increasing cross-section, and the part of the adjacent opposed member facing the hole is formed with an inwardly decreasing cross-section in a corresponding manner, and a preferably compressible gasket is arranged between the two mentioned parts of the members.

Apart from the fact that the gaskets (or gasket) between the disc-like members shall be compressible to allow a displacing movement of the disc-like members towards each other in the direction of movement of the movable opposed member or members, they should be able to maintain a firm grip on the surfaces against which they bear during the whole working procedure in the high pressure apparatus. Suitable materials in the gasket are, e.g., pyrophyllite, talc, pot stone, catlinite, lithographic stone and hexagonal boron nitride. The gaskets may be strengthened by metal inserts to increase their toughness and ductility, or be provided with supporting rings to prevent or counteract radial blowing-out. If the gaskets used between the opposed pressure-resisting members and the adjacent disc-like members are made compressible, they may be made of materials of the same type as the other gaskets and may also contain strengthening metal inserts.

BRIEF DESCRIPTION OF THE DRAWINGS

The invention will be explained in more detail, by way of example, with reference to the accompanying drawing, in which.

DESCRIPTION OF THE PREFERRED EMBODIMENTS

Figure 1:
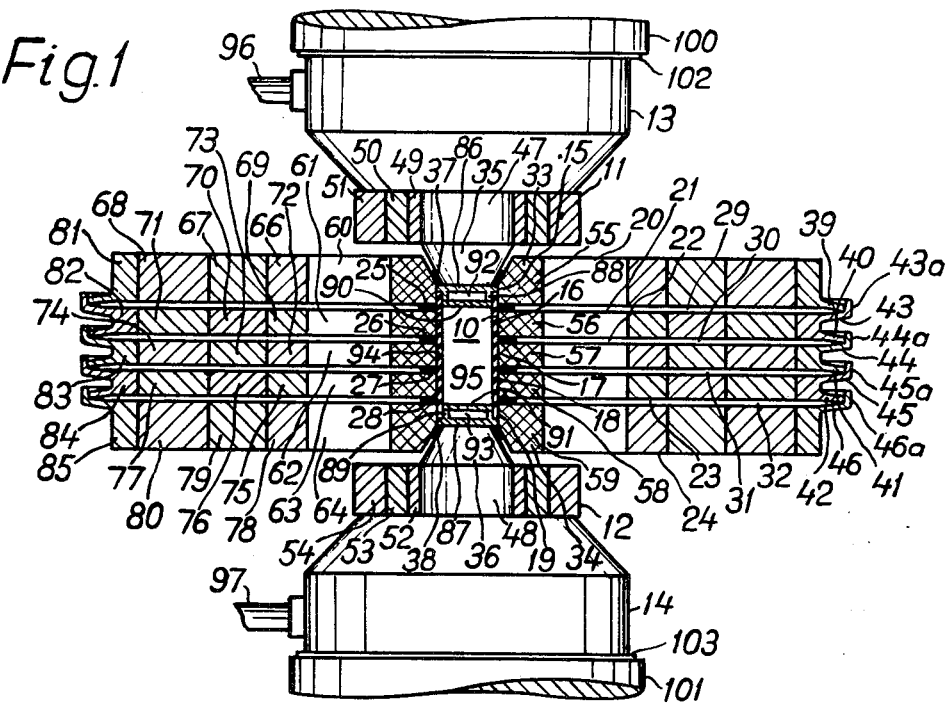
FIG. 1 shows a high pressure apparatus according to the present invention in section in the direction of compression and FIG. 2 shows a disc-like member in the high pressure apparatus according to FIG. 1, seen from above.

In the high pressure apparatus according to FIG. 1 the pressure chamber 10, which is cylindrical, is limited at its end surfaces by pressure-resisting members in the form of punches 11 and 12 which are movable in a direction towards the interior of the pressure chamber (i.e. in the direction of axis of the cylindrical chamber). The movement is brought about by the partly shown pistons 100 and 101 in a hydraulic press acting on the outsides of the pressure plates 13 and 14 — bearing against the punches — of, e.g., highspeed steel hardened to 60 RC. The pistons 100 and 101 are electrically insulated from the pressure plates by insulating layers 102 and 103, respectively, of phenolic resin paper laminate. Along the envelope surface the pressure chamber is limited by the walls of the cylindrical holes 15, 16, 17, 18 and 19 of several disc-like pressure-resisting and pressure-absorbing members 20, 21, 22, 23 and 24 and by compressible annular flat gaskets 25, 26, 27 and 28 of, e.g., pyrophyllite, arranged between the disc-like members, possibly provided in the middle with metal inserts which are parallel to the contact surfaces of the gaskets with the disc-like members. As is clear from the figure, the disc-like members are arranged one after the other in the direction of movement of the punches. The gaskets keep the disc-like members spaced from each other so that gaps 29, 30, 31 and 32 are formed between them. In the disc-like members 20 and 24, which are located nearest the punches, the holes of the parts 33 and 34 located nearest the punches are formed with outwardly increasing cross-section. In the exemplified case said holes are conical. The parts 35 and 36 of the punches 11 and 12 which are facing and located nearest the pressure chamber have a correspondingly inwardly decreasing cross-section, i.e. they are conical in the exemplified case. Between parts 33 and 35 and between parts 34 and 36, respectively, there are arranged compressible gaskets 37 and 38, for example of pyrophyllite, possible provided with metal inserts which are parallel to the contact surfaces of the gaskets with the parts 33 and 35 and 34 and 36, respectively. The shape of the gaskets is adjusted to the shape of said parts, which means that they are conical in the exemplified case. The disc-like members are provided with guide members which ensure that the disc-like members are not displaced in lateral direction or are obliquely positioned in relation to each other when the pressure is built up and maintained in the high pressure apparatus. The guide members, which may be constructed in various ways, consist in the shown case of resilient flanges 39, 40, 41 and 42 and 43, 44, 45 and 46, respectively, running along the periphery of the disc-like members and cooperating in pairs by the fact that a flange, e.g. 39, in a disc-like member is supported by a flange, e.g. 43, in an adjacent disc-like member, the last-mentioned flange having a support edge 43a for the flange 39. The support edges for the flanges 43, 44, 45 and 46 are designated 43a, 44a, 45a and 46a, respectively.

Another example of making the guide members is to make the parts 39, 40, 41 and 42, the substantially horizontal portions of the parts 43, 44, 45 and 46 and the parts 43a, 44a, 45a and 46a as separate loose parts, each of which in the two first-mentioned groups of parts inwardly bearing against a supporting edge on the corresponding ring 81, 82, 83, 84 or 85 described later on, and outwardly on a separate loose ring, which corresponds to each of the parts 43a–46a.

Each punch 11 and 12, respectively, has a central part 47 (which forms one whole continuous unit with the part 35) and 48 (which forms one whole continuous unit with the part 36) of cemented carbide, for example consisting of 94% WC and 6% Co. Concentric backing or binding rings 49, 50, 51 and 52, 53 and 54, respectively, of tool steel hardened to a hardness of 52–54 RC are shrunk onto the respective central parts in a known manner. The fitting surface may be slightly conical to facilitate the shrinking on. The task of the binding rings is to provide support pressure for the central part 47 and 48, respectively, of the punch in order to increase its ability to withstand great radial and tangential stresses.

Figure 2:
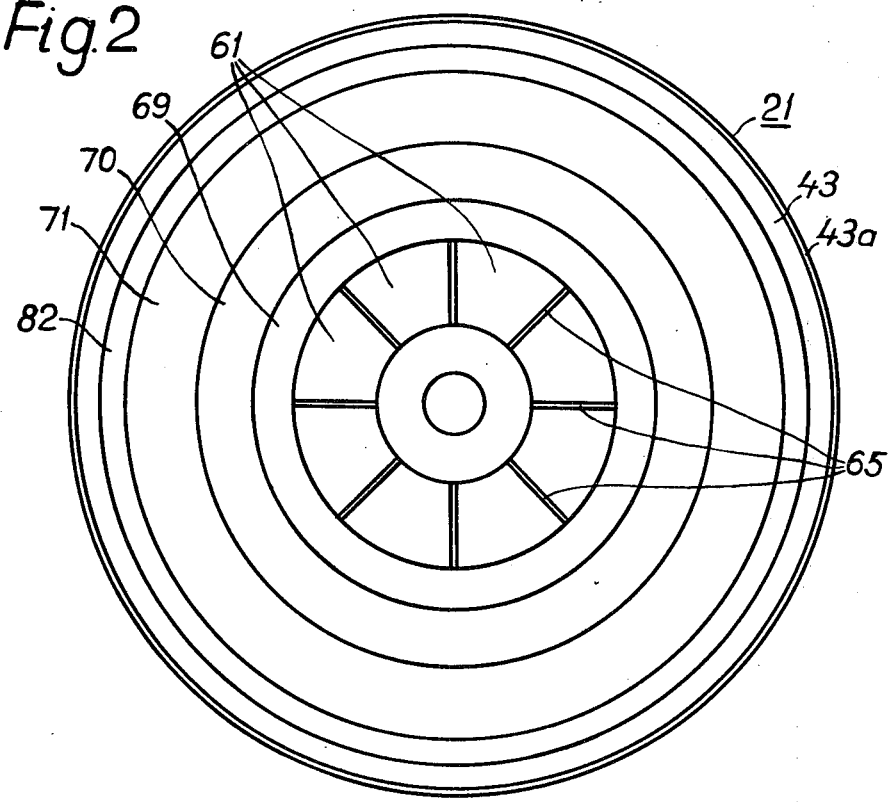

Each disc-like member 20 and 21, 22, 23 and 24, respectively, has a central ring 55 and 56, 57, 58 and 59, respectively, of cemented carbide, for example consisting of 90% WC and 10% Co. The rings are surrounded by sector-shaped discs 60 and 61, 62, 63 and 64, respectively, of cemented carbide, for example consisting of 85% WC and 15% Co, which are arranged with intermediate gaps 65 (see FIG. 2 which shows the disc-like member 21). Around these discs concentric backing or binding rings 66, 67, 68 and 69, 70, 71 and 72, 73, 74 and 75, 76, 77 and 78, 79, 80, respectively, are shrunk on in conventional manner. The material in them are tool steel hardened to a hardness of 52–54 RC. The fitting surfaces may be slightly conical. The binding rings achieve a support pressure on the central rings through the sector-shaped discs. At their extreme ends the disc-like members are provided with outer rings 81 and 82, 83, 84 and 85, respectively, of tool steel hardened to a hardness of 45 RC, in which the previously mentioned resilient flanges 39–42 and 43–46 serving as guide members form integral parts in the case illustrated in the figures. The guide members are formed so that they contribute to the support pressure on the central rings 55–59 by achieving a radially inwardly-directed pressure component.

In the pressure chamber a reaction element is arranged. It contains two disc 86 and 87, respectively, of electrically conducting material, e.g. steel, making contact with the punches, said discs having an inwardly protruding portion 88 and 89, respectively. A disc 90 and 91, respectively, of electrically conducting material, for example steel, makes contact with the inwardly-turned side of each cylindrical portion. The cylindrical spaces 92 and 93, respectively, which are formed of the portions 86, 88 and 90 and 87, 89 and 91, respectively, are filled up with a heat-insulating material, for example talc. Between the discs 86 and 87 and outside the cylindrical portions 88 and 89 and the discs 90 and 91, there extends an electrically insulating and heat-insulating tube 94, for example of pyrophyllite. Inside this tube and between the discs 90 and 91 there is arranged a material 95, which is to be exposed to pressure, in the exemplified case a reaction element consisting of graphite and nickel or another metal with the ability to dissolve carbon. By subjecting this reaction element to very high pressure and high temperature, the graphite can be converted to diamond. Heating is performed by electric current which is conducted through the reaction element between the punches through the portions 86, 88 and 90 and 87, 89 and 91, respectively. The connection conductors for the current which are arranged on the pressure plates 13 and 14 are designated 96 and 97. A reaction element comprising graphite and metal has a sufficient conductivity to be able to be directly subjected to resistance heating. If the material 95 is of another kind, which does not have such a good conductivity, the heating can be brought about by embedding tubes, discs, wires or other bodies of electric resistance material into the material or arranging them around the material.

The material 95 may be exposed to pressure by the pistons 100 and 101 in the hydraulic press, which achieve a displacement of the pressure plates 13 and 14 and the punches 11 and 12 against each other. The movement of the punches takes place while compressing the gaskets 25, 26, 27 and 28 in the direction of movement of the punches, i.e. perpendicular to the contact surfaces of the gaskets with the disc-like members 20, 21, 22, 23 and 24. Also the gaskets 37 and 38 are compressed substantially perpendicularly to the contact surfaces with the adjacent members. When the gaskets are compressed a certain amount of flow of the gasket material takes place in a direction away from the pressure chamber. When the punches move, the material 95 is compressed. This compression takes place not only from the ends of the pressure chamber, but also at various levels in the pressure chamber by the described compression of the gaskets 25, 26, 27 and 28. With the apparatus described pressures of more than 50,000 atmospheres and simultaneously temperatures of more than 1,700° C. can be achieved, i.e. pressures and temperatures which are usable for converting graphite to diamond.

In the simplest embodiment the high pressure apparatus according to the invention only contains two disc-like members and only one compressible gasket located between the disc-like members. The high pressure apparatus shown in FIG. 1 can thus be modified in such a way that the disc-like members 21, 22 and 23 may be removed, as well as the gaskets 26, 27 and 28. The limiting walls of the pressure chamber 10 between the punches 11 and 12 are then formed only of the walls in the holes 15 and 19 of the disc-like members 20 and 24 and of the compressible gasket 25.

Other embodiments of the invention are possible. Thus, the outer disc-like members may be constructed, for example, with openings without an outwardly increasing cross-section, the opposed pressure-resisting members then being suitably shaped as plane-parallel discs. Between these discs and the disc-like members located nearest thereto there may be used gaskets of the same kind as the illustrated gaskets between disc-like members, for example as the gasket 25. It would also be possible to use here non-compressible gaskets, for example gaskets in the form of steel rings, or to have no gaskets at all. Further, only one of the outer disc-like members, for example the member 24, may be shaped with an opening without an outwardly increasing cross-section, the opposed pressure-resisting member located nearest to this then being suitably shaped as a substantialy plane-parallel disc which is sealed against the pressure chamber by a gasket of the same type as the gasket 25. It is also possible to use a non-compressible gasket of the previously exemplified kind, or to have no gasket at all. One of the opposed pressure-resisting members 11 and 12, whether it is formed as a punch with a portion having an inwardly descreasing cross-section according to FIG. 1, or as a plane-parallel plate or in some other way, may also be stationary, for example resting on or consisting of a stationary press table.

We claim:

1. In a high pressure apparatus comprising a ring defining a pressure chamber at its center, a pair of opposed punches at least one of which is movable in a direction toward the other and toward the interior of the pressure chamber, and sealing material between each punch and the mouth of the chamber; the improvement in which the ring is comprised of at least two superimposed coaxial annular laminae, and an outwardly peripherally unconstrained compressible gasket surrounding the cavity and interposed between each pair of adjacent laminae, said gasket being of a material selected from the group consisting of pyrophyllite, talc, pot stone, catlinite, lithographic stone and hexagonal boron nitride, which gasket compresses and spreads radially outwardly as the distance between the punches decreases and the punches apply pressure to the ring and the laminae of the ring move axially toward each other.

2. Apparatus as claimed in claim 1, there being a plurality of said gaskets disposed one between each of a plurality of pairs of said adjacent laminae.

3. Apparatus as claimed in claim 1, in which said gasket is of pyrophyllite.

* * * * *